(12) United States Patent
Hum et al.

(10) Patent No.: US 6,961,823 B2
(45) Date of Patent: *Nov. 1, 2005

(54) STREAM-DOWN PREFETCHING CACHE

(75) Inventors: Herbert Hing-Jing Hum, Portland, OR (US); Zohar Bogin, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/628,434

(22) Filed: Jul. 29, 2003

(65) Prior Publication Data

US 2004/0059873 A1 Mar. 25, 2004

Related U.S. Application Data

(63) Continuation of application No. 09/541,392, filed on Mar. 31, 2000, now Pat. No. 6,643,743.

(51) Int. Cl.[7] .............................................. G06F 12/00
(52) U.S. Cl. ...................... 711/137; 711/134; 711/213; 712/207
(58) Field of Search ............................... 711/137, 134, 711/154, 108, 119, 213; 712/207

(56) References Cited

U.S. PATENT DOCUMENTS

| | | | | |
|---|---|---|---|---|
| 5,694,568 A | * | 12/1997 | Harrison, III et al. | 711/213 |
| 5,829,028 A | * | 10/1998 | Lynch et al. | 711/126 |
| 5,895,485 A | * | 4/1999 | Loechel et al. | 711/119 |
| 5,941,981 A | * | 8/1999 | Tran | 712/207 |
| 5,958,040 A | * | 9/1999 | Jouppi | 712/207 |
| 6,035,375 A | * | 3/2000 | Yanai et al. | 711/129 |
| 6,049,850 A | * | 4/2000 | Vishlitzky et al. | 711/136 |
| 6,070,230 A | * | 5/2000 | Capps | 711/137 |
| 6,098,154 A | * | 8/2000 | Lopez-Aguado et al. | 711/137 |
| 6,134,633 A | * | 10/2000 | Jacobs | 711/137 |
| 6,138,212 A | * | 10/2000 | Chiacchia et al. | 711/137 |
| 6,173,392 B1 | * | 1/2001 | Shinozaki | 712/207 |
| 6,202,130 B1 | * | 3/2001 | Scales, III et al. | 711/137 |
| 6,317,810 B1 | * | 11/2001 | Lopez-Aguado et al. | 711/120 |
| 6,643,743 B1 | * | 11/2003 | Hum et al. | 711/137 |

OTHER PUBLICATIONS

Tang, et al., "History Data Collection, Retrieving and Display in the NSLS Control System", © 1996 IEEE, p. 2253–2255.*

Chen, "An Effective Programmable Prefetch Engine for On-Chip Caches", ©1995, IEEE, p. 237–242.*

* cited by examiner

*Primary Examiner*—Brian R. Peugh
(74) *Attorney, Agent, or Firm*—Kenyon & Kenyon

(57) ABSTRACT

An apparatus and method for prefetching cache data in response to data requests. The prefetching uses the memory addresses of requested data to search for other data, from a related address, in a cache. This, or other data, may then be prefetched based on the result of the search.

19 Claims, 16 Drawing Sheets

STREAM-DOWN PREFETCHING CACHE

RELATED APPLICATIONS

This patent application is a continuation application of, and claims priority to, U.S. application Ser. No. 09/541,392, filed Mar. 31, 2000, now U.S. Pat. No. 6,643,743.

FIELD OF THE INVENTION

The present invention relates to computer memory. More particularly, the present invention relates to stream-down prefetching data into a cache memory.

BACKGROUND OF THE INVENTION

Most modern computer system architectures include a cache. That is, a level of the memory hierarchy between the processor and the main memory. Generally, access to data stored in a cache is much faster than the time needed to retrieve data from main memory. However, cache memory is typically more expensive and smaller than main memory. A common cache analogy is that main memory is like books on shelves in a library and a cache is like a small subset of those books on a desk. The widespread use of cache memory is a clear statement that it does increase system performance, more than enough to justify added complexity.

It is possible to have multiple levels of cache, or more correctly multiple levels of memory, in a memory hierarchy. Generally, in such a system, all the data is stored at the lowest level, which is typically the largest in size and the slowest to access. Data is then copied to the higher levels, which may decrease in size and increase in speed.

Designing a memory hierarchy for a general purpose computer, including algorithms for what data should be stored in cache is a complex process that has received a lot of attention over the years. Empirically, computer programs have a tendency to reuse data that has been accessed recently (temporal locality) and also to access data located near data that has been accessed recently (spatial locality). Many memory hierarchies utilize the existence of these localities for storing data in a cache. For example, keeping recently accessed data in a cache exploits temporal locality. Retrieving blocks of data, instead of an individual word, into a cache exploits spatial locality. This disclosure will use the term "data" to include both the traditional concept of data, such as alpha-numeric constants or variables, set or read by a computer program, as well as program instructions. For the memory hierarchy, both types of data are merely values stored at a particular location and the ultimate uses of the individual stored values are irrelevant. Some architectures do, however, maintain separate caches for traditional data and instructions, and must distinguish between them.

Ideally, whenever a processor calls for data from memory, that data will be found in the cache. However, cache misses do occur. Two common causes of cache misses are cold-start misses and capacity misses. A cold-start miss occurs when a processor first accesses a particular range of data addresses. A capacity miss occurs due to limited cache sizes, such as when previously cached data is "bumped" from the cache by newer data just before it is needed. A larger cache may decrease the capacity miss rate, but have no effect on the cold-start miss rate.

BRIEF DESCRIPTION OF THE DRAWINGS

FIGS. 3A–3C depict a stream-up data access trend in accordance with an embodiment of the present invention.

FIGS. 4A–4D depict an out-of-order stream-up data access trend in accordance with an embodiment of the present invention.

FIGS. 6A–6C depict an out-of-order stream-down data access trend in accordance with an embodiment of the present invention.

DETAILED DESCRIPTION

Figure 1:
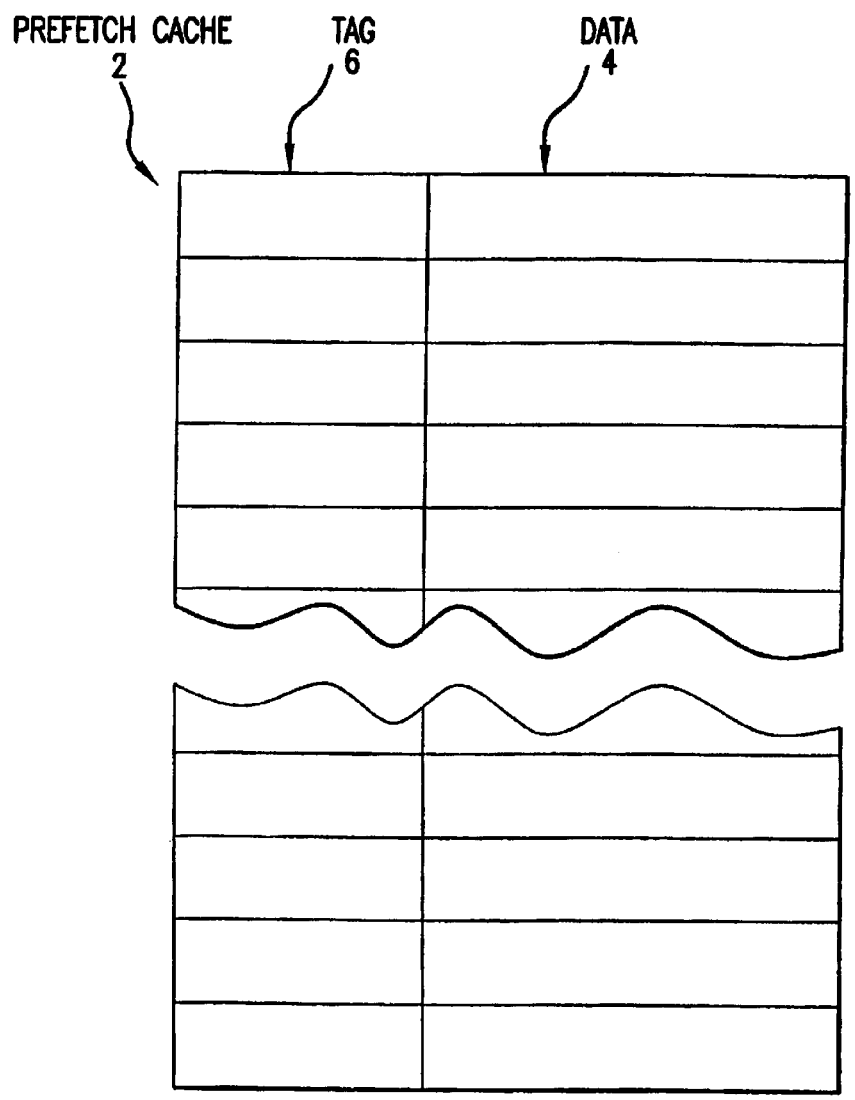
FIG. 1 is a diagram of a prefetch cache in accordance with an embodiment of the present invention.

An embodiment of the present invention is directed to prefetching data into a cache, based on a history of data requests. The data prefetching is based on a trend, upward or downward, in the memory addresses of previously requested data. This prefetching is referred to as stream-up or stream-down, depending on the trend direction. An embodiment of the present invention uses a request history buffer (RHB) to store and detect trends in data requests. A prefetch cache is preferably used to store the prefetched data. The prefetch cache may be adapted for use in conjunction with other cache memories in the system.

Many memory hierarchies save recently requested data in a cache in order to take advantage of temporal locality in data requests. Also, many memory hierarchies retrieve blocks of contiguous data to take advantage of the spatial locality in data requests. However, neither of these techniques explicitly attempts to dynamically anticipate a data request trend and prefetch data based on such a trend.

An embodiment of the present invention prefetches data, whether or not a data request trend has been established, defaulting to stream-up prefetching. That is, the next higher memory address is prefetched, if not already in cache, with each data request, unless a downward trend has been established. If there is a downward trend in the memory address requests, the data from the next lower address is prefetched.

Memory hierarchy systems that retrieve an entire block of data, in order to take advantage of spatial locality, may achieve the result of the present invention in some cases, but only because such a brute force retrieval blindly brings a large amount of data in a cache. The present invention, by being much more selective in prefetching data, does not bring in as much extraneous data. Also, block data retrieval will often result in a cache miss when the next data address is in the adjacent block of data. Prefetching may be more efficient than block data retrieval, and more accurately anticipate spatial locality for requested data at the border of a memory block. Also, prefetching data anticipates a data retrieval request. Retrieving an entire block of data ignores trends in the direction of data request addresses. As such, the present invention uses more information to better anticipate future data requests.

The present invention also lowers the cold-start miss rate by examining the history of data requests, anticipating what data that will be requested and prefetching that data. That is, data is retrieved prior to the data being explicitly called by a processor, and decreasing the overall number of cache misses. The prefetching algorithm in accordance with an embodiment of the present inventor may be biased toward data with numerically higher addresses (stream-up prefetching) in memory. However, stream-down prefetching may be used when such a pattern of data requests is found in the data request history.

Sectored caches are cache architectures that store data from multiple sectors of contiguous memory locations within a single line of cache. For example, a two-sectored cache with a 32 bytes cache line would store data from two contiguous memory sectors of 16 bytes each within a single line of cache. A more general description of such sectored caches would be an N-sectored cache, where N could be any positive integer value, storing N sectors per line of cache. Typically, N will equal a small integer power of two. However, the present invention is not intended to be limited to any particular value of N. As will be shown below, values of N larger than one complicate the prefetching slightly and must be explicitly considered. The examples described below use a two-sectored cache. Those of ordinary skill in the art, with the benefit of this disclosure, will understand how embodiments of the present invention can be easily adapted for other values of N. An additional complication to the prefetching is the processing of instructions out-of-order. A technique used in some modern computer architectures is to look ahead and speculatively execute instructions before the instructions would occur in the program sequence. These instructions are speculatively executed in the sense that conditional branching may occur and the out-of-order instruction may not be needed. However, the processing of these out-of-order instructions may affect both the data in the system cache and the RHB, making it more difficult to identify trends. An embodiment of the present invention may be used with a system architecture that processes instructions out-of-order, as well as architectures that do not. The preferred cache size may be adjusted based on how far a particular system looks ahead to process out-of-order instructions.

FIG. 1 describes a prefetch cache 2 in accordance with an embodiment of the present invention. Prefetch cache 2 preferably uses content addressable memory (CAM), which may also be called associative memory. A CAM requires that each entry of data field 4 be mapped to its corresponding memory location by a tag 6, preferably the same as the memory location address used by the processor to retrieve data from memory. A CAM type cache organization is known to those of ordinary skill in the art.

Figure 2:
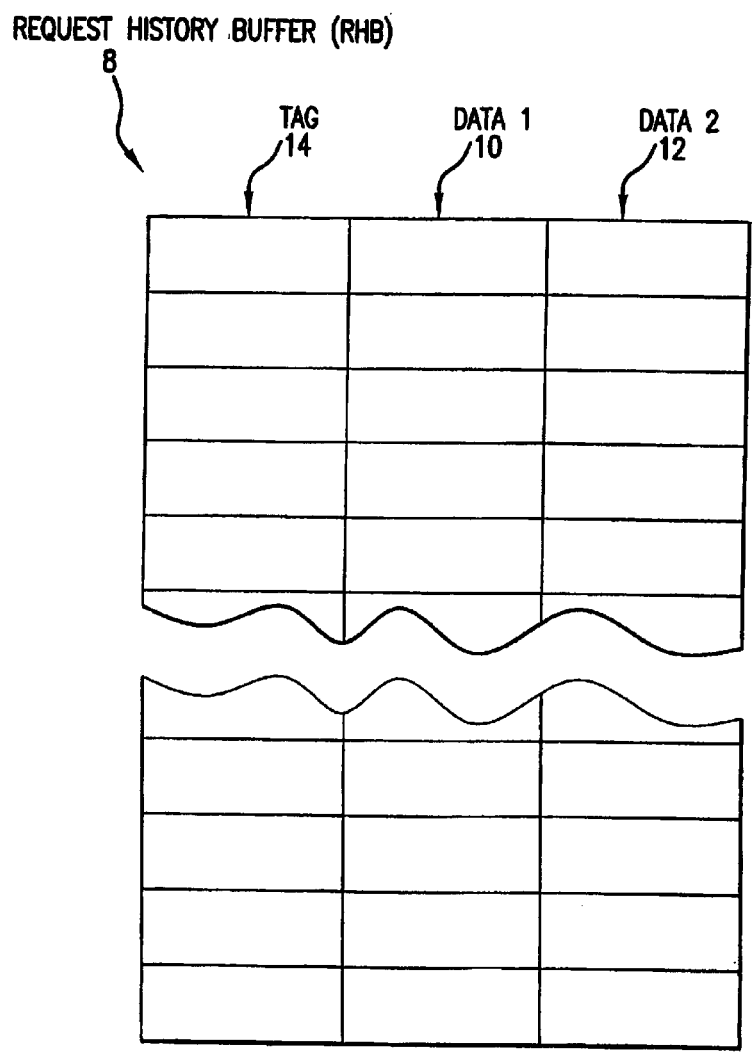
FIG. 2 is a diagram of a request history buffer in accordance with an embodiment of the present invention.

The RHB, unlike prefetch cache 2, does not store data from memory. Rather, RHB flags whether or not data from a particular sector has been retrieved. The format of the RHB follows from that of the prefetch cache 2. A RHB for use with an N-sector prefetch cache will typically have N flags, or data fields, in addition to an address tag field. The flags in the RHB may be a single bit. FIG. 2 describes a RHB 8 in accordance with an embodiment of the present invention. RHB 8 in FIG. 2 is designed to work with a two-sectored cache, although the present invention is not intended to be limited to any particular number of sectors or cache organization. The RHB has two data fields, 10 and 12, per line. Tag 14 in RHB 8 may be one bit shorter than tag 6 in prefetch cache 2. Preferably, the low bit of the data memory location address will map directly to either data field 10 or 12.

The present disclosure will largely ignore cache management details such as validity bits, selecting optimal cache sizes, and writing cache data back to memory, as such issues are known to those of ordinary skill in the art and the present invention is not intended to be limited to any particular cache organization.

Figure 3A:
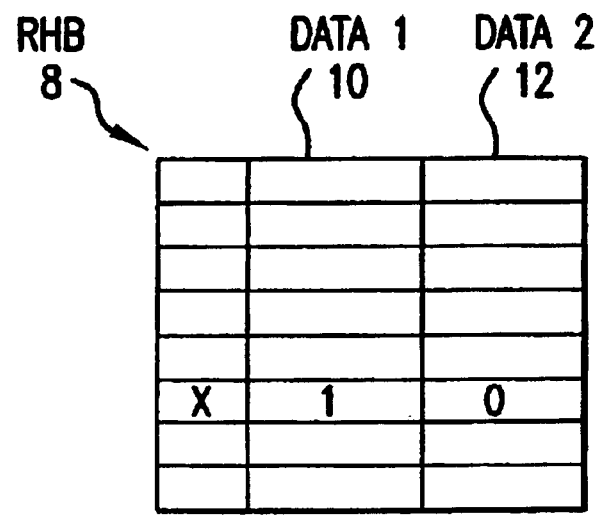
Figure 3A:
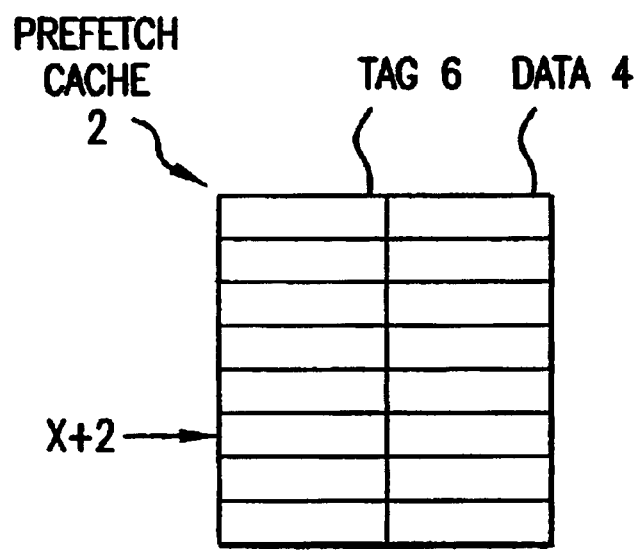
Figure 3B:
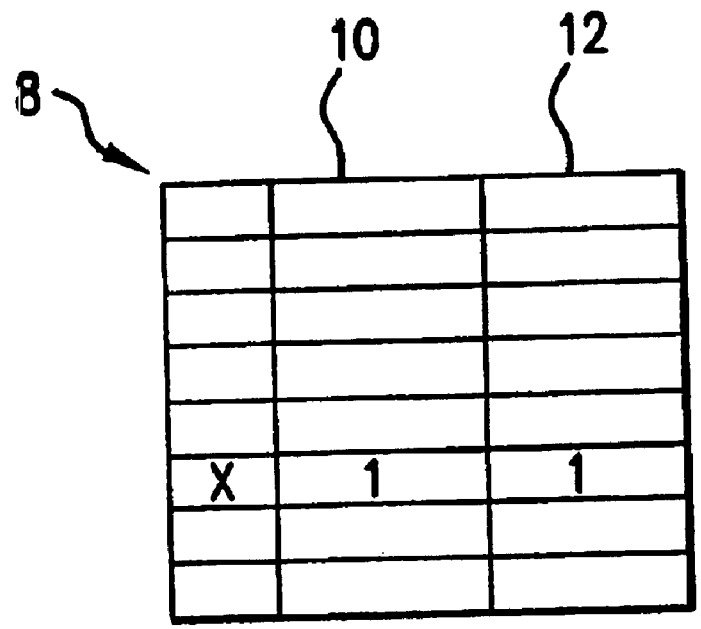
Figure 3B:
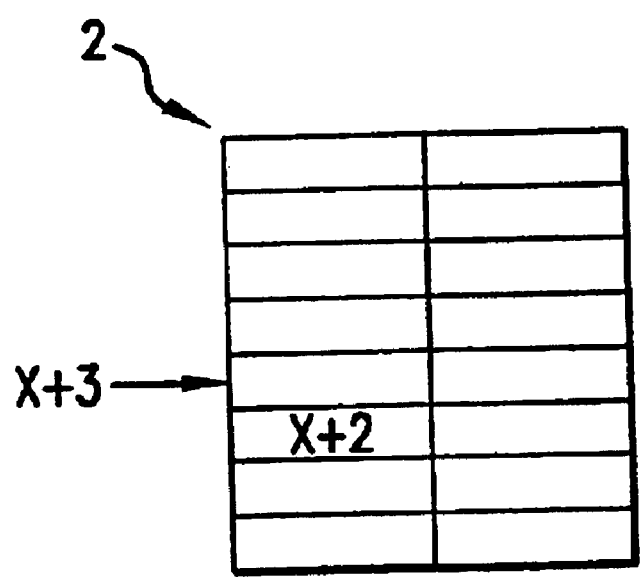
Figure 3C:
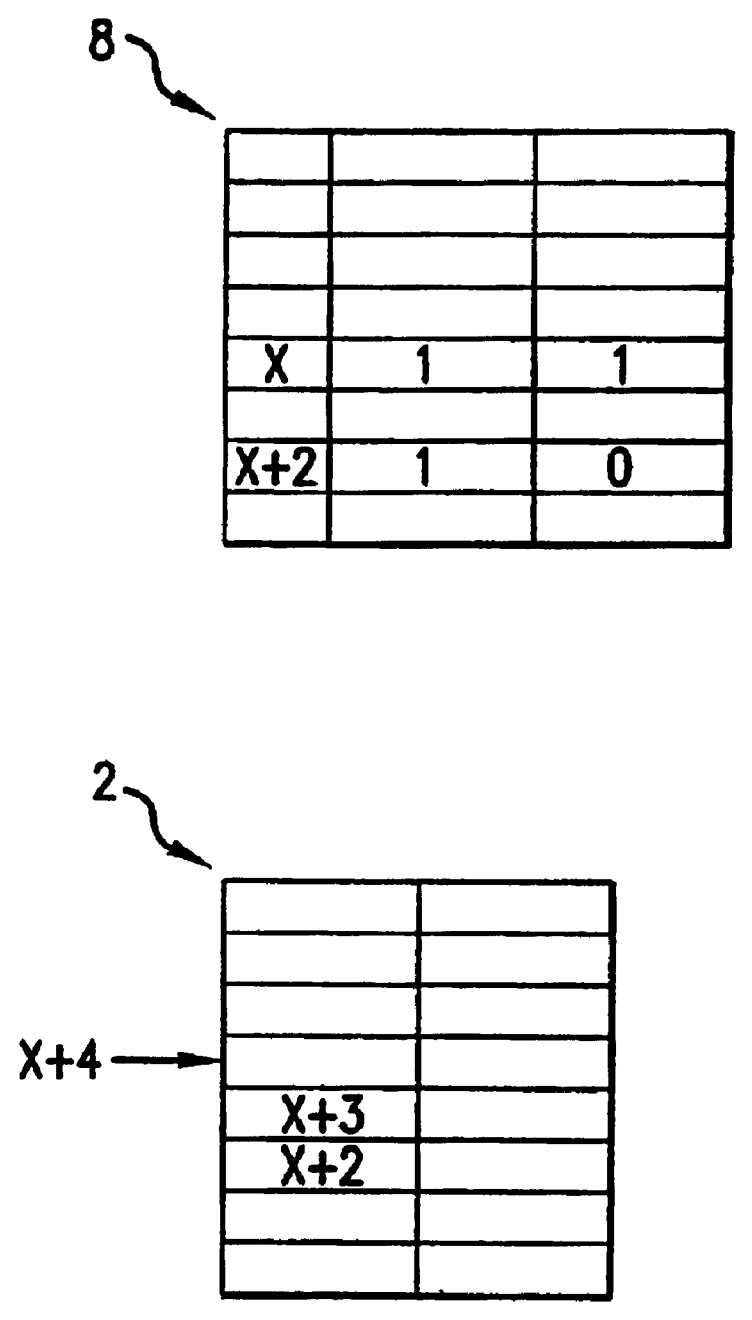

FIGS. 3A–3C illustrate an embodiment of the present invention performing stream-up prefetching with a two-sector cache. RHB 8 is a buffer for storing the history of data requests. Initially, data is called from a sector of memory identified by X (X is a memory address modulo the sector size), and this memory address, X, is stored in RHB 8. A bit is set in data field 10 to indicate address X has been called. Next, RHB 8 is checked for a tag to indicate the presence of data from sector X+2 and prefetch cache 2 is checked for the data. For example, if a sector is 16 bytes and X is 120 hexadecimal, then X+2 is 140 hexadecimal. Because the bit for sector X +2 is not indicated in RHB 8, nor is the data in prefetch cache 2, the stream-up prefetching direction is chosen as the default direction. With a two-sector cache, the sector for prefetching is two sectors away from the sector containing the data address explicitly called by the processor. If the data from sector X+2 is not indicated in either RHB 8 or prefetch cache 2, it is retrieved from memory, or prefetched, and stored in prefetch cache 2.

FIG. 3B depicts contents of RHB 8 and prefetch cache 2 following the request of data from sector X+1. There is a trend of requesting data from increasing memory addresses, so there is no need to change from the default direction of stream-up prefetching. RHB 8 and prefetch cache 2 are then checked for the presence of sector X+3, the next prefetch sector for stream-up prefetching in a two-sectored cache. If X+3 is not found, it is prefetched and stored in prefetch cache 2. A bit is set in data field 12 to indicate the presence of data from section X+1.

In FIG. 3C, there has been a request for data from memory address X+2. This time, the requested data is present in prefetch cache 2 and does not have to be retrieved from memory. The requested data is dispatched from prefetch cache 2, and sector X+4 is prefetched, if it is not already present in prefetch cache 2 or indicated in RHB 8.

Note that RHB 8 which is to be used with a two-sectored cache, has two (single bit) data entries per line in FIGS. 3A–3C. In an embodiment of the present invention with a four-sectored cache, RHB 8 would have four (single bit) data entries per line. Note also that there is a preferred, and consistent, location for each data entry with RHB 8. That is, the upper portion of RHB 8 is used to indicate the presence of even sector addresses (such as X) and the lower portion is used for the odd addresses (such as X+1). The present invention is not intended to be limited to any particular address allocation scheme within RHB 8, only that the scheme chosen remain consistent.

The notation used in FIGS. 3A–3C, as well as those that follow, is a simplified form of the actual entries in prefetch cache 2. Only tag 6 field of prefetch 2 is used in the examples to signify that data in a particular sector has been prefetched. The actual data, stored in data 4 field, has been omitted for clarity.

The device that prefetches data from memory may be called the "prefetcher". The device that works in coordination with the prefetcher to set bits in data fields 10 and 12 of RHB 8 may be called the "prefetch control unit".

Figure 4A:
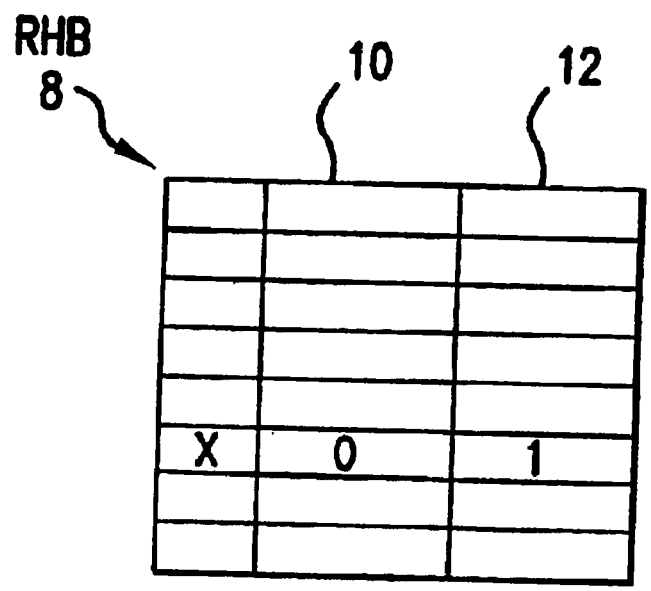
Figure 4A:
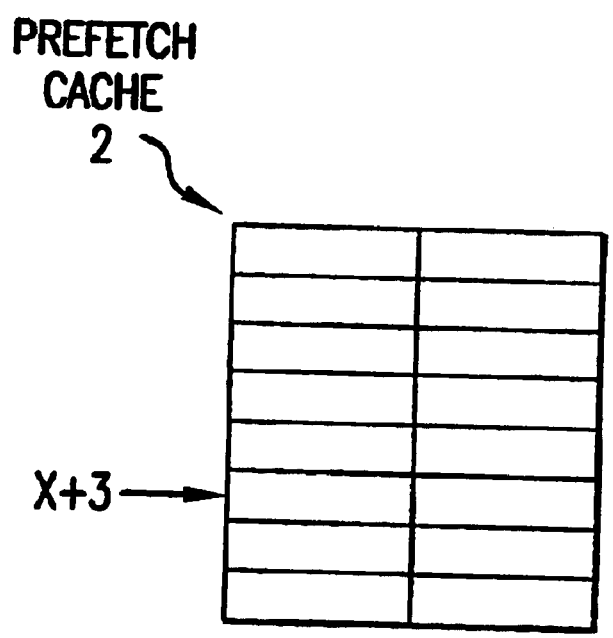
Figure 4B:
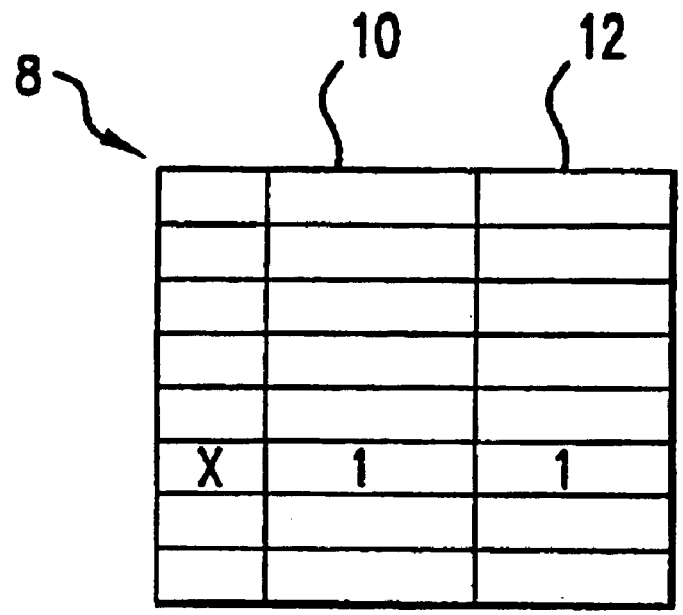
Figure 4B:
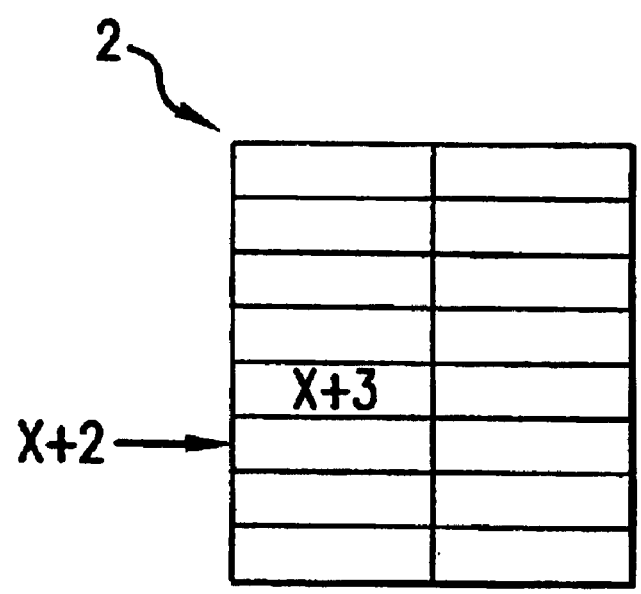
Figure 4C:
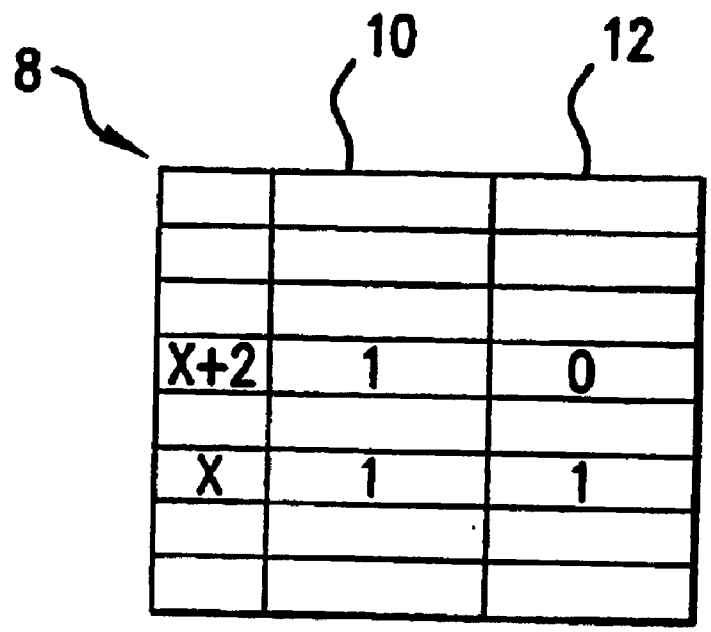
Figure 4C:
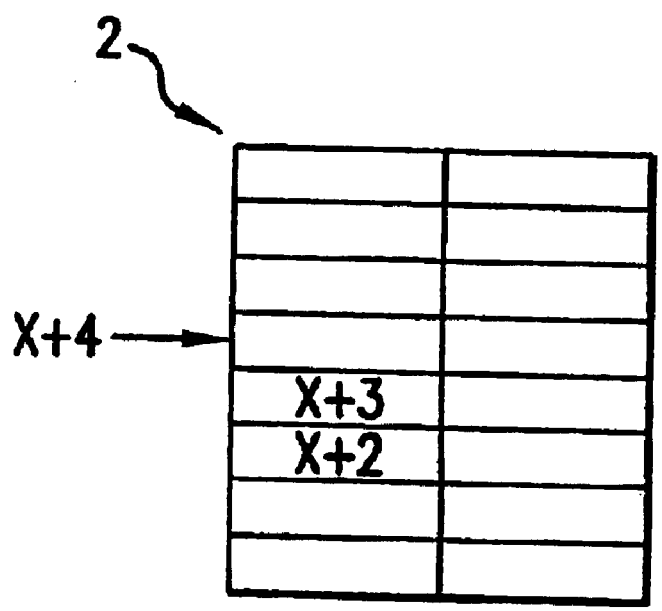

FIGS. 4A–4C also illustrates an embodiment of the present invention performing stream-up prefetching. In FIG. 4A, data is initially requested from sector X+1. This information (request/presence of sector X+1) will be stored in the lower portion of RHB 8, in contrast to the upper portion used to indicate the presence of sector X in FIG. 3A. Stream-up prefetching is again selected as the default prefetch direction when there is insufficient information to establish a trend. RHB 8 and prefetch cache 2 are checked for the presence of data from sector X+3 in either. If it is not, sector X+3 is prefetched and stored in prefetch cache 2.

Next, as shown in FIG. 4B, data is required from sector X, as indicated by the bit set in data field 10 of RHB 8.

Although this data request is to a lower memory address than the initial request for X+1, an embodiment of the present invention continues stream-up prefetching, searching for sector X+2. Since the sector X+2 is not already present in either RHB 8 or prefetch cache 2, it is retrieved from memory and stored in prefetch cache 2.

FIG. 4C shows the next request for data from sector X+2. This data is then dispatched from prefetch cache 2, and prefetching continues on sector X+4, if it is not already indicated or present in either RHB 8 or prefetch cache 2.

The process illustrated in FIGS. 4A–4C may occur with computer architectures using out-of-order instruction processing. That is, although the data requested does not initially appear to be consistent with a stream-up trend, this could be the result of an out-of-order instruction requesting data.

Figure 5A:
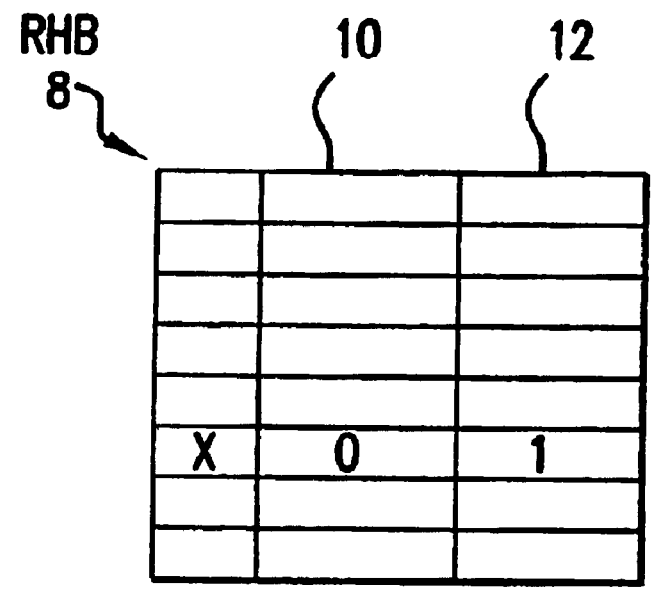
FIGS. 5A–5C depict a stream-down data access trend in accordance with an embodiment of the present invention.
Figure 5A:
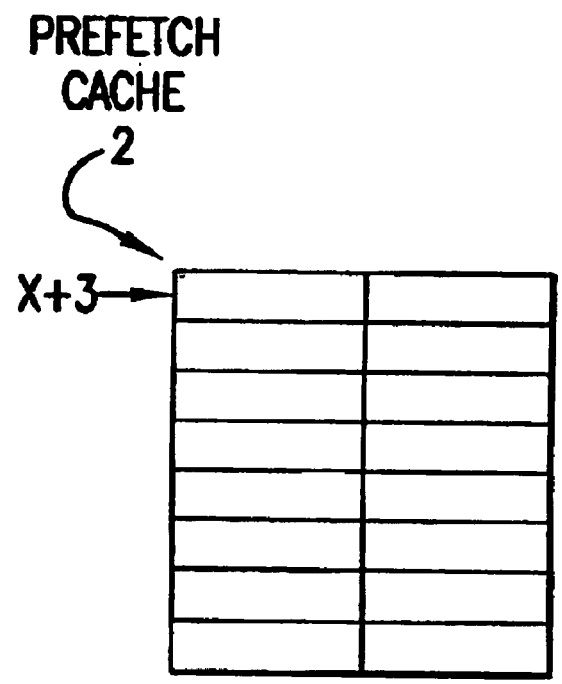
Figure 5B:
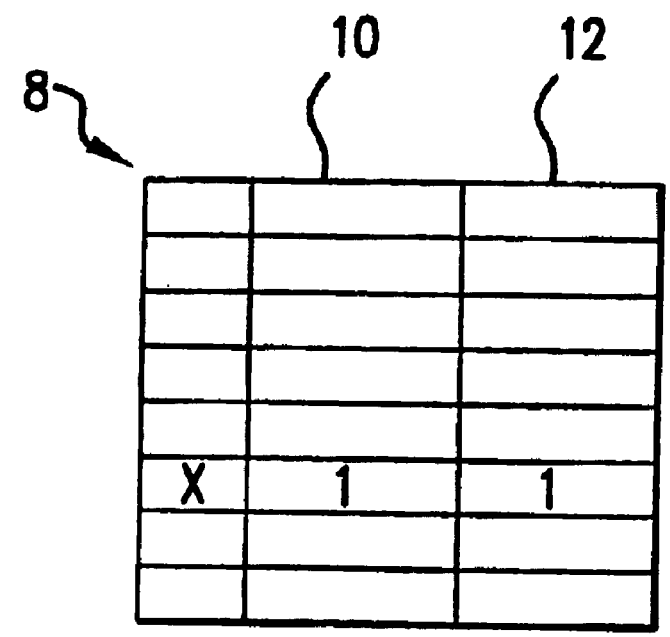
Figure 5B:
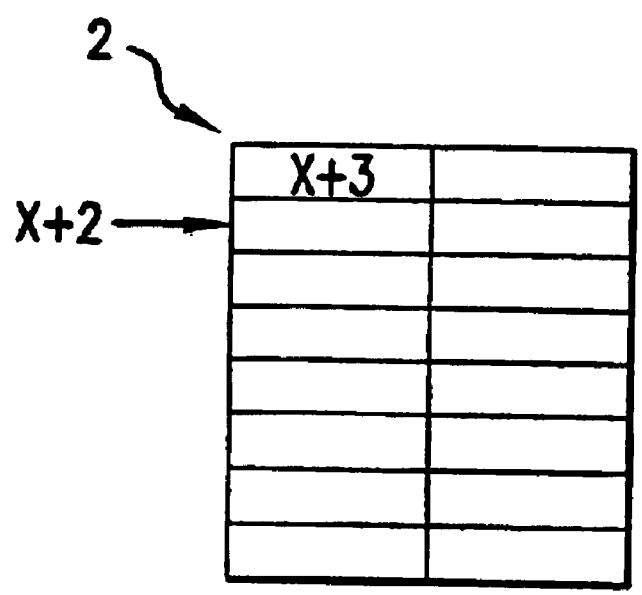
Figure 5C:
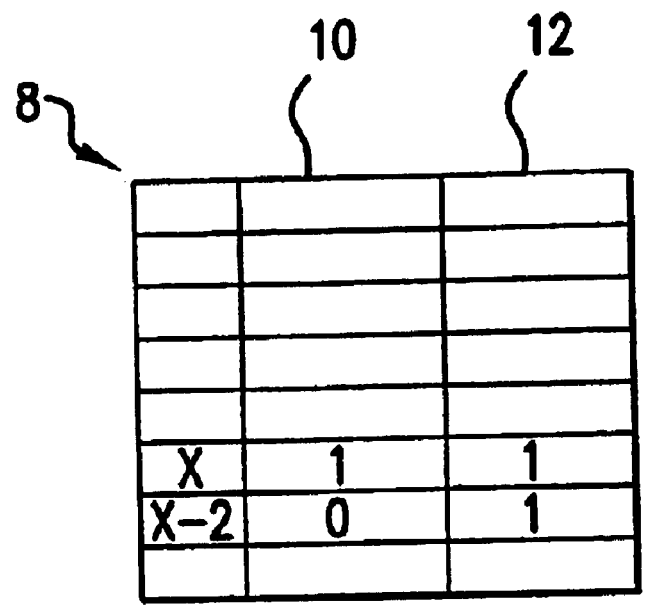
Figure 5C:
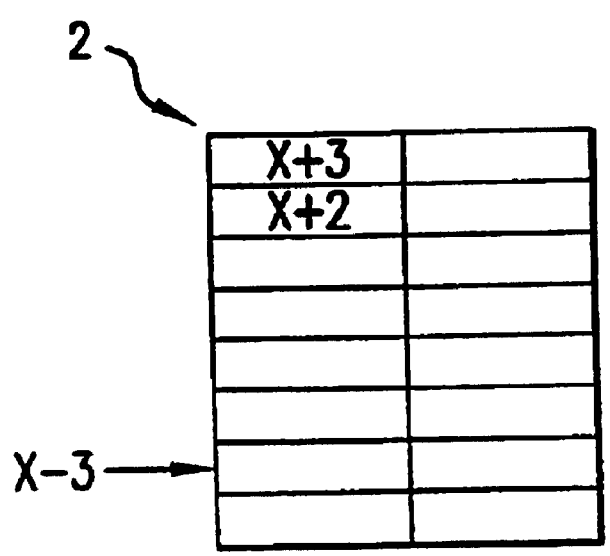

FIGS. 5A–5D illustrate stream-down prefetching in accordance with an embodiment of the present invention. FIGS. 5A and 5B are identical to FIGS. 4A and 4B. The process explicitly requests data from sectors X+1 and X, with data from sectors X+3 and X+2 then prefetched. In FIG. 5C, however, the stream-down trend continues with a request for data from sector X−1, which is retrieved from memory, and the request noted in RHB 8. The request for data from sector X−1 triggers a check for the presence of sector X+1 in both prefetch cache 2 and RHB 8. The bit set in data field 12 of RHB 8 indicates sector X+1 has been called. The presence of X+1 in RHB 8 is used as an indication of a trend towards lower memory addresses, or a call for stream-down prefetching. Next, using a stream-down prefetch direction, the sector X−3 is prefetched, and stored in prefetch cache 2, if its presence is not flagged in RHB 8 or it is not already present in prefetch cache 2.

Figure 5D:
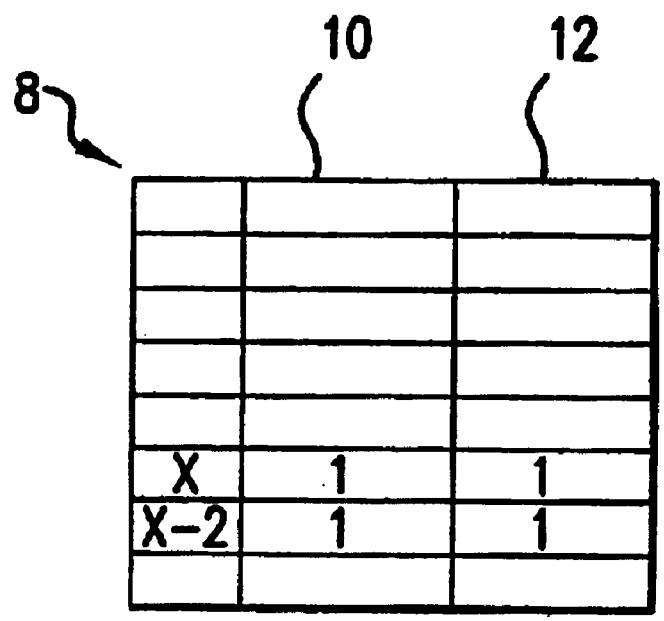
Figure 5D:
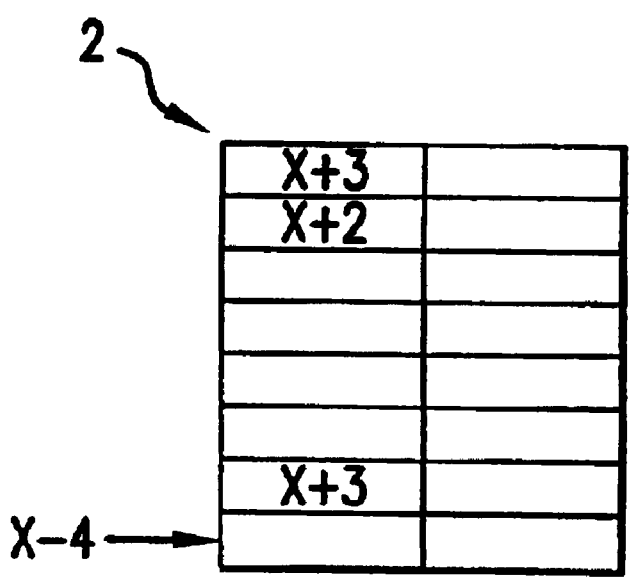

In FIG. 5D data is called from sector X−2, continuing in the stream-down direction. In response to the request for X−2, RHB 8 and prefetch cache 2 are checked for the presence of sector X. Since it is present in RHB 8, sector X−4 is prefetched and stored in prefetch cache 2, if either the flag is not already present in RHB 8 or the data is in prefetch cache 2.

Figure 6A:
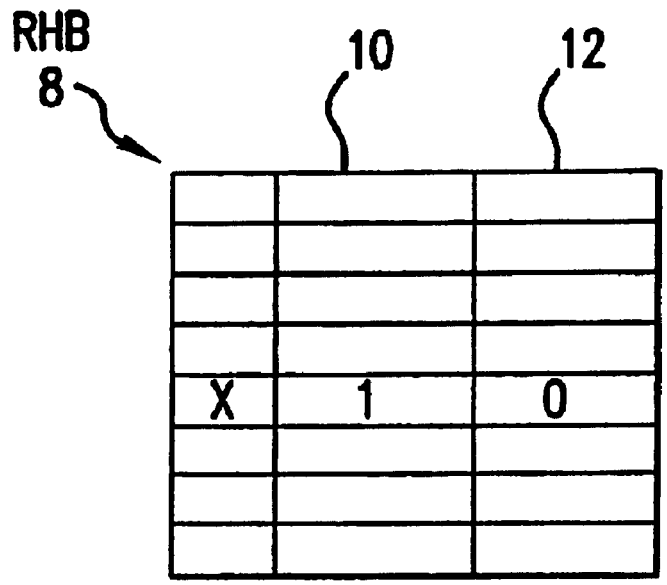
Figure 6A:
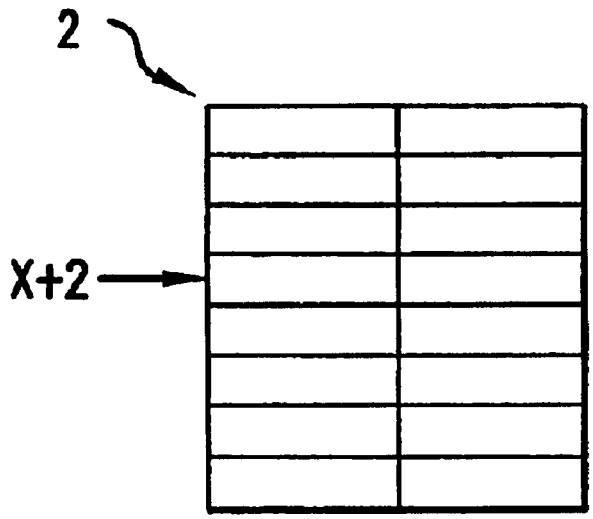
Figure 6B:
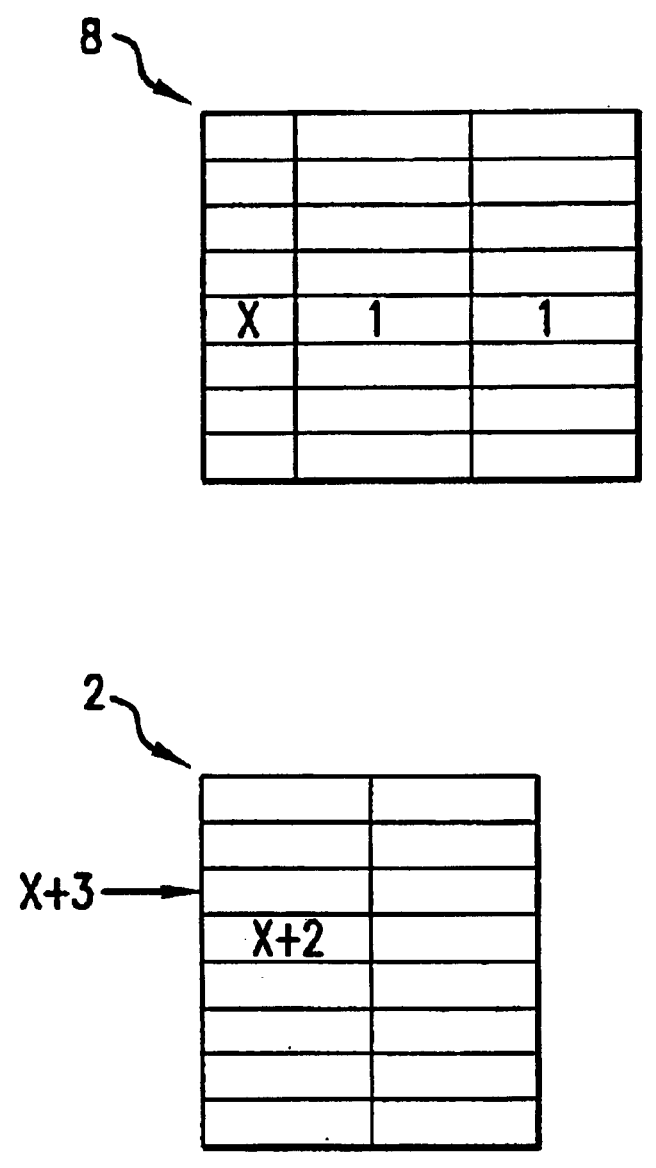
Figure 6C:
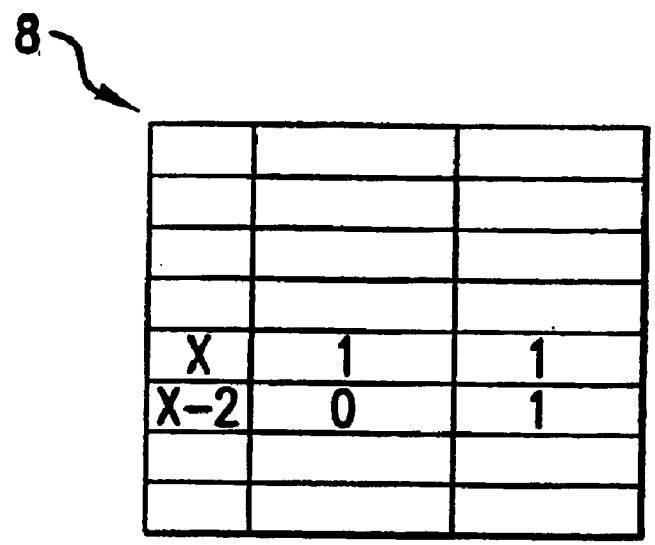
Figure 6C:
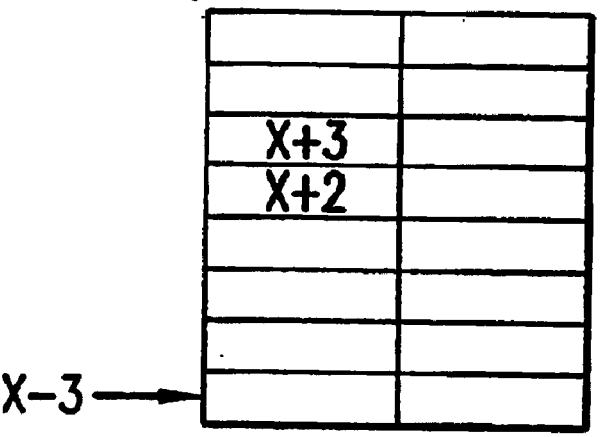

FIGS. 6A–6C also illustrates an embodiment of the present invention performing stream-down prefetching. Initially there is a request for data from sector X. The presence of sector X is indicated in RHB 8. The default stream-up prefetching, with a two-sector cache, looks for the presence of sector X+2 in RHB 8 or the data in prefetch cache 2. Since sector X+2 is not present in either RHB 8 or prefetch cache 2, it is prefetched and stored in prefetch cache 2. Next, the processor calls for data from sector X+1, which also will be retrieved from memory and its presence noted in RHB 8. In response to the request for data in sector X+1, data from sector X+3 is prefetched, since it is not already present in prefetch cache 2 or its presence indicated in RHB 8. In FIG. 6C there is a request for data from sector X−1, which will be retrieved from memory and its presence indicated in RHB 8. The data from sector X+1 would be prefetched, in a (default) stream-up prefetch using a two-sector cache, in response to a request for data from sector X−1 by the processor. However, a flag for sector X+1 is already present in RHB 8. The indication of sector X+1, a numerically higher memory address, is used by an embodiment of the present invention to switch to stream-down prefetching. In this stream-down prefetching mode, data from sector X−3 is prefetched and stored in prefetch cache 2.

In the process illustrated in FIGS. 6A–6C, there are calls for data from sectors X, X+1 and then X−1. The overall trend towards lower memory location addresses, is obscured somewhat by the second data request. However, out-of-order instruction processing can produce just such an effect. An embodiment of the present invention examines RHB 8 and prefetch cache 4 to determine the overall trend. That is, whether to use the default stream-up direction or to switch to stream-down prefetching.

An embodiment of the present invention uses larger prefetch cache 2 size (32 cache lines) than the associated RHB 8 size (8 or 16 entries) where the prefetch cache 2 is fully-associative and employs a least-recently used replacement policy. Such a differential sizing may eliminate the need to coordinate cache replacement between prefetch cache 2 and RHB 8.

Figure 7:
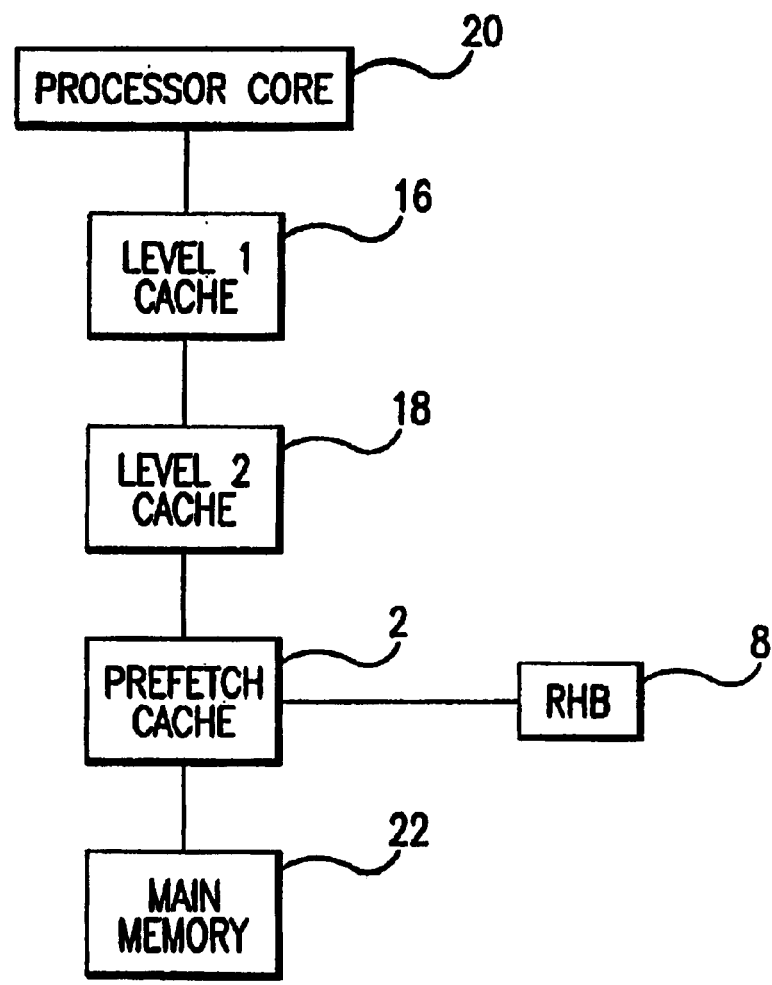
FIG. 7 is a block diagram of a computer system in accordance with an embodiment of the present invention.

FIG. 7 show a system architecture with two levels of cache (16 and 18) between processor core 20 and main memory 22, in addition to prefetch cache 2 and the associated RHB 8. The examples illustrated in this description are for the case where the level 2 cache 18 is a two-sector cache. That is, the prefetch cache 2 and RHB 8 as described can capture streaming patterns from a two-sector cache. Other embodiments of the present invention may use a prefetch cache 2 between the two levels of cache (16 and 18), either in addition to or instead of, prefetch cache 2 shown in FIG. 7. Similarly, the present invention is not intended to be limited to any particular number of cache levels.

The present invention may be implemented in software or firmware, as well as in programmable gate array devices, ASICs and other hardware.

Although various embodiments are specifically illustrated and described herein, it will be appreciated that modifications and variations of the present invention are covered by the above teachings and within the purview of the appended claims without departing from the spirit and intended scope of the invention. Moreover, the present invention applies to a broad range of computer architectures, and is therefore a general approach that includes a broad range of specific implementations.

What is claimed is:

1. A system comprising:
    a processor;
    a memory coupled to the processor;
    a request history buffer coupled to the processor;
    a pre-fetch control unit coupled to the request history buffer, wherein the pre-fetch control unit is to check the request history buffer for a flag associated with a second memory location that is based on a first memory location called by the processor;
    a pre-fetcher coupled to the memory to pre-fetch data associated with the second memory location from the memory if no flag associated with the second memory location is in the request history buffer.

2. The system of claim 1, further comprising:
    a pre-fetch cache coupled to the pre-fetcher, wherein the pre-fetch cache is to store the pre-fetched data associated with the second memory location.

3. The system of claim 2, wherein the pre-fetcher is to pre-fetch data associated with the second memory location from the memory if data associated with the second memory location is not in the pre-fetch cache.

4. The system of claim 2, wherein the pre-fetcher is to pre-fetch data from a third memory location if data from the second memory location is flagged in the request history buffer or present in the pre-fetch cache, wherein the third memory location is based on the first memory location and the second memory location.

5. The system of claim 4, wherein the pre-fetcher is to pre-fetch data in a stream-up direction.

6. The system of claim 4, wherein the pre-fetcher is to pre-fetch data in a stream-down direction.

7. The system of claim 2, wherein the pre-fetcher is to store a flag, associated with data in the second memory location, in the request history buffer if the data in the second memory location is called.

8. An apparatus for pre-fetching data comprising:
a cache;
a pre-fetch cache coupled to the cache;
a memory, wherein a first data with a first data address is called from the memory and stored in the cache;
a request history buffer (RHB) coupled to the prefetch cache, the RHB to store a flag indicating whether the first data has been called from the memory;
a pre-fetcher to fetch data associated with an initial guess pre-fetch address responsive to the first data to search the cache and to generate a second data address, wherein the pre-fetcher is to fetch a second data associated with the second data address from the memory and to store the second data in the pre-fetch cache; and
a pre-fetch control unit to coordinate the flag stored in the RHB, wherein the pre-fetch control unit is responsive to the pre-fetcher.

9. The apparatus of claim 8, wherein the initial guess prefetch address is numerically higher than that of the first data address.

10. The apparatus of claim 8, wherein the second data address is equal to the initial guess prefetch address when the initial guess prefetch address is not found in the cache.

11. The apparatus of claim 8, wherein the second data address is numerically lower than the initial guess pre-fetch address if the initial guess prefetch address is found in the pre-fetch cache.

12. The apparatus of claim 8, wherein the pre-fetch cache is to be searched for the first data, before the first data is called from the memory.

13. The apparatus of claim 8, wherein the RHB is responsive to a two-sector cache.

14. The apparatus of claim 8, wherein the pre-fetch cache is a content addressable memory (CAM) cache.

15. The apparatus of claim 8, further comprising:
a sector number reader to read a user-set value "N" and wherein the RHB is responsive to an N-sector cache.

16. The apparatus in accordance with claim 8, wherein the pre-fetch cache is larger than the RHB.

17. A system comprising:
a memory;
a processor coupled to the memory, wherein the processor is to call data from a first memory location in the memory;
a request history buffer to store a flag associated with the first memory location, wherein the flag is to indicate that the data has been called by the processor;
a pre-fetch control unit to check for a flag associated with data from a second memory location in the request history buffer, wherein the second memory location is to be calculated by shifting the first memory location by N in a first direction;
a pre-fetch cache; and
a pre-fetcher to pre-fetch data from the second memory location in the memory and store it in the pre-fetch cache, if data from the second memory location is not flagged in the request history buffer or present in the pre-fetch cache.

18. The system of claim 17, wherein the pre-fetcher is to pre-fetch data from a third memory location, wherein the third memory location is to be calculated by shifting the first memory location by N in a second direction opposite to the first direction, if data from the second memory location is flagged in the request history buffer or present in the pre-fetch cache.

19. The system of claim 17, further comprising:
a cache to store the data called by the processor.

* * * * *